(12) United States Patent
Noodt et al.

(10) Patent No.: US 7,810,329 B2
(45) Date of Patent: Oct. 12, 2010

(54) DUAL-CHARGED INTERNAL COMBUSTION ENGINE AND METHOD FOR OPERATING THE SAME

(75) Inventors: Florian Noodt, Lehre OT Flechtorf (DE); Marc-Jochen Schweizer, Braunschweig (DE); Manfred Kloft, Königslutter (DE)

(73) Assignee: Volkswagen AG, Wolfsburg (DE)

( * ) Notice: Subject to any disclaimer, the term of this patent is extended or adjusted under 35 U.S.C. 154(b) by 447 days.

(21) Appl. No.: 11/795,782

(22) PCT Filed: Dec. 20, 2005

(86) PCT No.: PCT/EP2005/013730

§ 371 (c)(1),
(2), (4) Date: Jul. 20, 2007

(87) PCT Pub. No.: WO2006/079403

PCT Pub. Date: Aug. 3, 2006

(65) Prior Publication Data

US 2008/0110170 A1    May 15, 2008

(30) Foreign Application Priority Data

Jan. 28, 2005    (DE) .................... 10 2005 004 122

(51) Int. Cl.
*F02B 33/44* (2006.01)
*F02B 29/04* (2006.01)
*F02B 37/04* (2006.01)
*F02B 33/00* (2006.01)

(52) U.S. Cl. ..................... 60/612; 123/562; 123/563

(58) Field of Classification Search .............. 60/612; 123/562, 563; F02B 29/04, 37/04
See application file for complete search history.

(56) References Cited

U.S. PATENT DOCUMENTS 2,706,472 A * 4/1955 Sims ................. 123/559.3

(Continued)

FOREIGN PATENT DOCUMENTS

DE        3205721 A1 *  8/1983

(Continued)

OTHER PUBLICATIONS

Machine Translation of DE 43 20 045 A1, published on Jul. 28, 1994.*

(Continued)

*Primary Examiner*—Thai Ba Trieu
(74) *Attorney, Agent, or Firm*—Lucas & Mercanti, LLP; Klaus P. Stoffel

(57) ABSTRACT

The invention relates to an internal combustion engine, especially of a motor vehicle, which comprises an air path for intake air in which a mechanically driven charge unit (20), especially a compressor, which can be connected and disconnected by means of a coupling (36), an exhaust gas turbocharger (18), an intake pipe (32), connected to air inlets of a cylinder block (10) of the internal combustion engine, and a charge cooler (34) are mounted. One pressure outlet (35) of the mechanically driven charge unit (20 is directly connected to the intake pipe (32) and one pressure outlet (24) of the exhaust gas charger (18) is connected to an intake inlet (28) of the mechanically driven charge unit (20). The pressure outlet (24) of the exhaust gas charger (18) is connected to the intake inlet (28) of the mechanically driven charge unit (20) via an on-off butterfly valve (26) and upstream of said on-off butterfly valve (26) to the intake pipe (32) via a load butterfly valve (30). The charge cooler (34) is integrated into the intake pipe (32) to give an intake/charge cooler module.

5 Claims, 2 Drawing Sheets

U.S. PATENT DOCUMENTS

| | | | | |
|---|---|---|---|---|
| 3,469,393 | A * | 9/1969 | Tryhorn | 60/609 |
| 3,595,013 | A * | 7/1971 | Brille et al. | 123/561 |
| 3,712,280 | A * | 1/1973 | Brille et al. | 60/609 |
| 3,795,231 | A * | 3/1974 | Brille | 123/561 |
| 4,556,038 | A * | 12/1985 | Okamoto et al. | 123/564 |
| 4,730,457 | A * | 3/1988 | Yamada et al. | 60/609 |
| 4,903,488 | A | 2/1990 | Shibata | |
| 5,230,320 | A * | 7/1993 | Hitomi et al. | 123/559.1 |
| 5,269,143 | A * | 12/1993 | Cikanek et al. | 123/563 |
| 5,706,790 | A * | 1/1998 | Kemmler et al. | 123/564 |
| 5,905,233 | A * | 5/1999 | Gobert | 181/229 |
| 5,909,075 | A * | 6/1999 | Heimark | 310/103 |
| 6,311,676 | B1 * | 11/2001 | Oberg et al. | 123/563 |
| 6,634,344 | B2 * | 10/2003 | Stretch | 123/559.3 |
| 6,688,292 | B2 * | 2/2004 | Ruppel et al. | 123/563 |
| 6,910,469 | B2 * | 6/2005 | Renkonen | 123/563 |
| 7,004,154 | B2 * | 2/2006 | Joyce et al. | 123/563 |
| 7,077,113 | B2 * | 7/2006 | Bilek et al. | 123/563 |
| 7,191,769 | B2 * | 3/2007 | Raab et al. | 123/563 |
| 7,484,368 | B2 * | 2/2009 | Jorgensen | 60/607 |
| 2006/0157036 | A1 * | 7/2006 | Andersen | 123/563 |
| 2008/0087402 | A1 * | 4/2008 | Burk | 165/101 |

FOREIGN PATENT DOCUMENTS

| | | |
|---|---|---|
| DE | 32 27 459 | 1/1984 |
| DE | 4202077 | 7/1993 |
| DE | 4320045 | 7/1994 |
| DE | 19928523 | 1/2001 |
| DE | 10332989 | 4/2004 |
| DE | 102004032777 A1 * | 7/2005 |
| DE | 102007051505 A1 * | 4/2009 |
| FR | 2553827 A1 * | 4/1985 |
| GB | 2143580 A * | 2/1985 |
| JP | 60240826 A * | 11/1985 |
| JP | 01208520 | 8/1989 |

OTHER PUBLICATIONS

Machine Translation of DE 103 32 989 A1, published on Apr. 15, 2004.*

* cited by examiner

DUAL-CHARGED INTERNAL COMBUSTION ENGINE AND METHOD FOR OPERATING THE SAME

This is a U.S. national stage of application No. PCT/EP2005/013730, filed on Dec. 20, 2005. Priority is claimed on that application and on the following application:

Country: Germany, Application No.: DE 10 2005 004 122.1 Filed: Jan. 28, 2005

BACKGROUND OF THE INVENTION

The invention concerns an internal combustion engine, especially of a motor vehicle, with an air path for intake air, in which are installed a mechanically driven supercharger, especially a compressor, which can be connected and disconnected by means of a coupling; an exhaust gas turbocharger; an intake pipe connected with the air intakes of a cylinder block of the internal combustion engine; and a charge air cooler. A pressure outlet of the mechanically driven supercharger is directly connected to the intake pipe, and a pressure outlet of the exhaust gas turbocharger is connected to a suction intake of the mechanically driven supercharger. The invention also concerns a method for operating this internal combustion engine.

U.S. Pat. No. 4,903,488 discloses an internal combustion engine with an air path for intake air, in which a compressor, an exhaust gas turbocharger, and a throttle valve are arranged, where an outlet of the compressor is connected with an inlet of the exhaust gas turbocharger, and the throttle valve is arranged downstream of the exhaust gas turbocharger. A compression throttle valve is arranged in an air passage that bypasses the compressor, and this valve optionally closes exclusively this air passage that bypasses the compressor.

DE 32 27 459 A1 discloses a system of this general type for supercharging an internal combustion engine. It comprises a combination of an exhaust gas turbocharger with a compressor that is mechanically driven by the shaft of the internal combustion engine. This compressor provides the supercharging during start-up and in the lower speed ranges. It is switched off when a sufficient supercharging pressure of the turbocharger is reached and switched back on when this pressure drops. A pressure outlet of the mechanical compressor opens directly into an intake pipe of the internal combustion engine. In a preferred embodiment, all the charge air is passed from the exhaust gas turbocharger through the mechanically driven compressor, which, during idling, is fully open for the full delivery of the charge air. As long as the exhaust gas turbocharger does not deliver sufficient charge air due to the engine speed being too low, i.e., during start-up and in the low engine speed range, the internal combustion engine is supercharged by the mechanical compressor. When the exhaust gas turbocharger reaches sufficient output in the higher engine speed ranges, the mechanical compressor runs idle, i.e., in the engine speed ranges in which the outputs of the mechanical charger would drop. Alternatively, a system with a bypass line for the compressor is proposed, where the bypass line is closed by a valve during the operation of the compressor. This valve is opened as soon as the compressor is no longer mechanically driven, i.e., in the higher load ranges, in which the exhaust gas turbocharger can make a sufficiently high charge pressure available.

SUMMARY OF THE INVENTION

The objective of the invention is to improve an internal combustion engine of the type described above with respect to its design, assembly, and manner of operation.

To this end, the invention provides that, in an internal combustion engine of the aforementioned type, the pressure outlet of the exhaust gas turbocharger is connected to the suction intake of the mechanically driven supercharger via an on-off butterfly valve and to the intake pipe via a load control butterfly valve upstream of the on-off butterfly valve, where the charge cooler is integrated in the intake pipe to form an intake/charge cooler module.

This has the advantage that, due to the special arrangement of the superchargers in the air path to the intake pipe and the incorporation of the charge cooler in the intake pipe, an otherwise necessary throttle valve can be eliminated, and at the same time a very small volume is present between the mechanically driven supercharger and the combustion chamber, so that there is a significant improvement in the dynamic behavior.

It is advantageous for the on-off butterfly valve to be designed in such a way that, in the completely closed state, it essentially seals the air path to the suction intake of the mechanically driven supercharger against a secondary air flow through the mechanically driven supercharger.

In accordance with the invention, in a method of the aforementioned type, it is provided that, in those operating states of the internal combustion engine in which the instantaneous torque demand can be produced by the exhaust gas turbocharger, the on-off butterfly valve is brought into its completely closed position, the mechanically driven supercharger is deactivated, and the load is controlled by means of the load control butterfly valve and/or by adjustment of the turbocharger, and in those operating states of the internal combustion engine in which the instantaneous torque demand exceeds the maximum torque that can be produced by the exhaust gas turbocharger, the on-off butterfly valve is brought into its completely open position, the mechanically driven supercharger is activated, and the load control butterfly valve is closed to the extent necessary to reach the torque demand.

This has the advantage that the load control butterfly valve mounted in the intake/charge cooler module has a dual function, namely, on the one hand, it has the function of a conventional throttle valve in those operating states in which the exhaust gas turbocharger can make available the torque demanded of the internal combustion engine, and, on the other had, it has the function of a recirculated air control valve for a bypass line of the mechanically driven supercharger at high instantaneous torque demands that exceed the capacity of the exhaust gas turbocharger, so that an additional power control element in the air path can be dispensed with.

It is effective for the on-off butterfly valve to be closed during idling and in the lower partial-load range and to be completely open in all other operating states.

The invention is explained in greater detail below with reference to the figures.

DETAILED DESCRIPTION OF THE INVENTION

Figure 1:
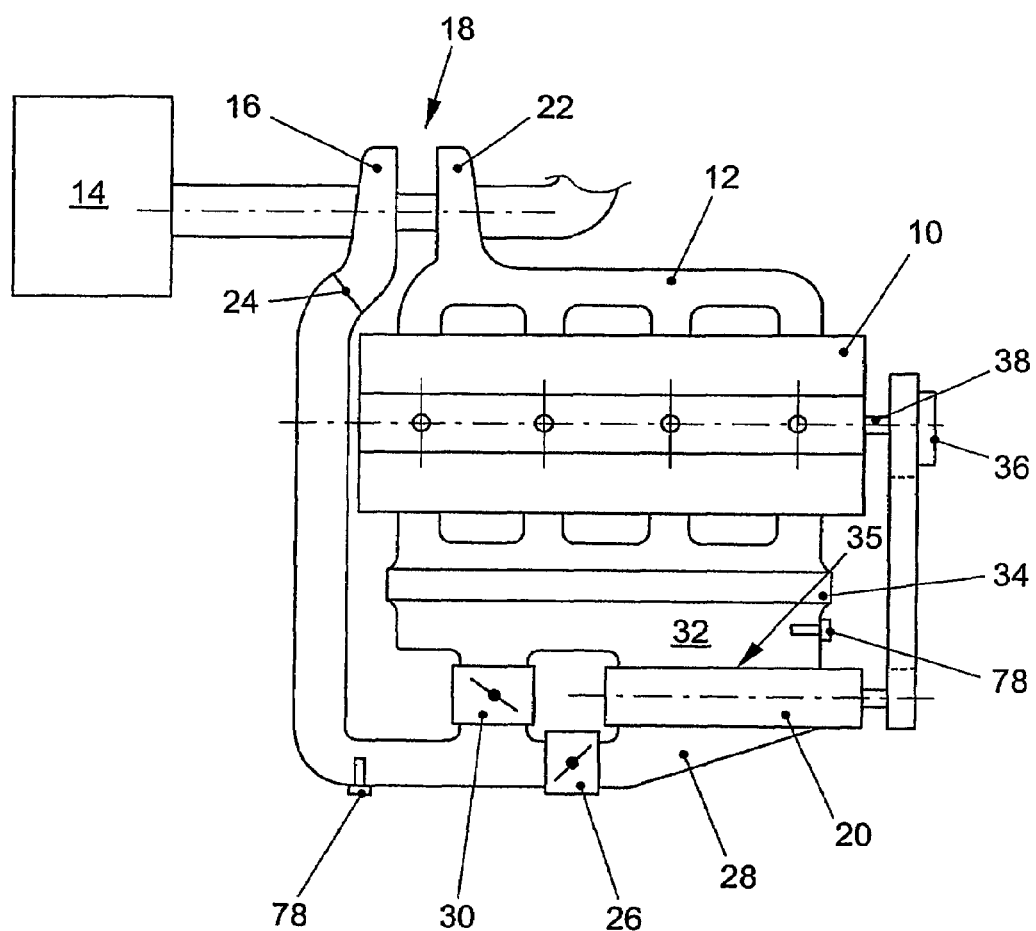
FIG. 1 is a schematic representation of a preferred embodiment of an internal combustion engine of the invention.

FIG. 1 shows a preferred embodiment of an internal combustion engine of the invention. It comprises an engine block 10, an exhaust system 12, and an air path for the intake of combustion air or fresh air. The following are mounted in the air path: an air filter 14, a compressor 16 of an exhaust gas turbocharger 18, and a mechanically driven supercharger 20, for example, a compressor. A turbine 22 of the exhaust gas turbocharger 18 is installed in the exhaust system 12 of the internal combustion engine. A pressure outlet 24 of the exhaust gas turbocharger 18 is connected with a suction intake 28 of the mechanically driven supercharger 20 via an on-off butterfly valve 26. Upstream of the on-off butterfly valve 26, the pressure outlet 24 of the exhaust gas turbocharger 18 is connected with an intake pipe 32 via a load control butterfly valve 30. In addition, a charge cooler 34 is provided, which is integrated in the intake pipe. The charge cooler 34 and intake pipe 32 together form an intake/charge cooler module. A pressure outlet 35 of the mechanically driven supercharger 20 is directly connected with the intake pipe 32. This results in a very small volume between the mechanically driven supercharger 20 and the combustion chambers in the engine block 10, and this in turn produces significant improvement of the dynamic behavior. The mechanically driven supercharger 20 is connected with a crankshaft 38 of the internal combustion engine by a coupling 36 and is mechanically driven by it. Depending on the operating state of the internal combustion engine, the mechanical connection between the mechanically driven supercharger 20 and the crankshaft 38 is produced or broken by the coupling 36. Pressure transducers 78 for measuring the pressure in the air path and the intake pipe 32 are installed as part of the engine speed control system.

The term "on-off butterfly valve" means that this valve has only two different positions, namely, either completely open or completely closed (on-off valve). There is no provision for intermediate positions. The on-off butterfly valve 26 is designed in such a way that in its completely closed position, the air path to the suction intake 28 of the mechanically driven supercharger 20 is closed essentially flow-tight, so that secondary air flow through the mechanically driven supercharger 20 is prevented.

The compressor of the exhaust gas turbocharger 18 draws air in through the air filter 14 and, depending on the energy made available by the turbine 22 of the exhaust gas turbocharger 18, conveys the air mass flow to the load control butterfly valve 30. The power output of the exhaust gas turbocharger 18 and the turbine 22 is automatically controlled by a waste gate and possibly a variable turbine geometry of the exhaust gas turbocharger 18. The load control butterfly valve 30 is flange-mounted directly on the intake/charge cooler module 32, 34.

Figure 2:
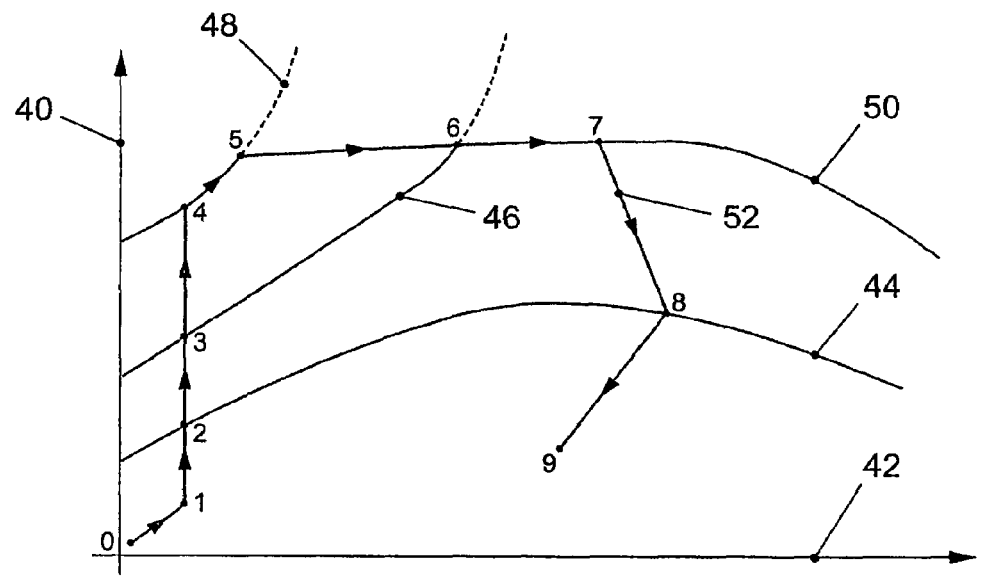
FIG. 2 is load-speed diagram.

FIG. 2 shows a load-speed diagram, in which the engine torque Md is plotted on the vertical axis 40, and the engine speed $n_{mot}$ is plotted on the horizontal axis 42. One graph 44 characterizes the maximum attainable engine torque as a function of the engine speed $n_{mot}$ when the internal combustion engine is operated as a naturally aspirated engine (aspirated engine full load). One graph 46 characterizes the maximum attainable engine torque as a function of the engine speed when the internal combustion engine is operated with the turbocharger (turbocharger full load). One graph 48 characterizes the maximum attainable engine torque as a function of the engine speed when the internal combustion engine is operated with the turbocharger and mechanically driven supercharger 20 (supercharger and compressor full load). One graph 50 characterizes the maximum engine torque that can be delivered by the engine (maximum load). One trace 52 over the points 0 to 9 in the load-speed diagram of FIG. 2 illustrates an example of a curve of torque versus speed.

Figure 3:
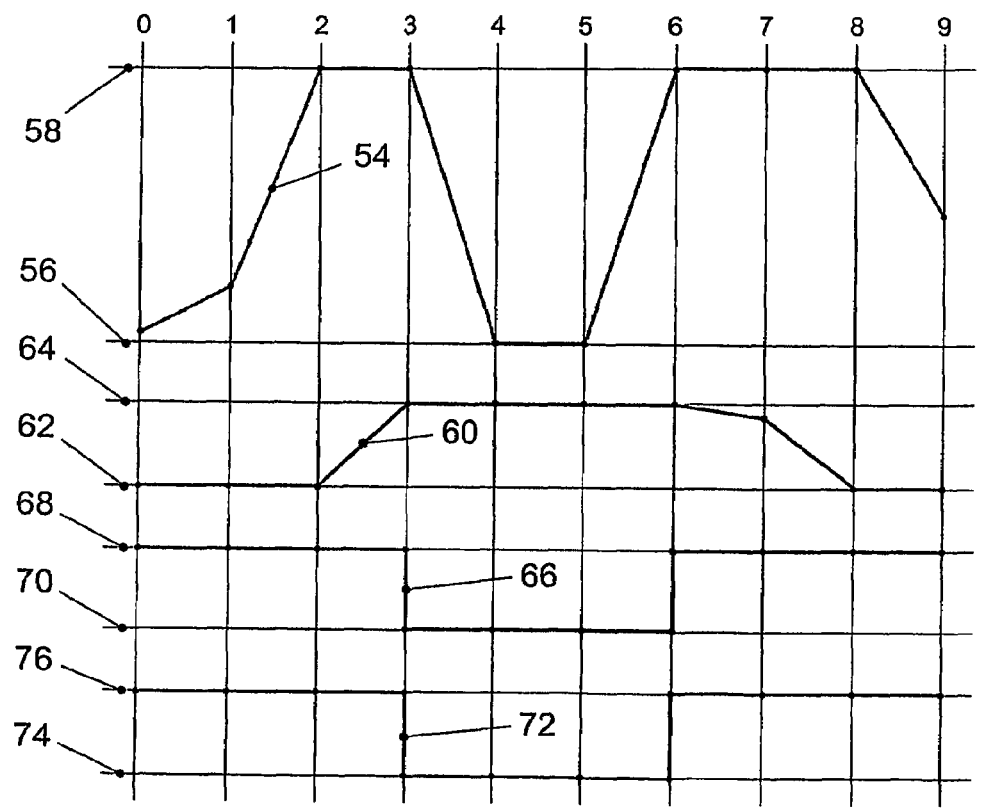
FIG. 3 is a graphic representation of the operation of the internal combustion engine of the invention.

FIG. 3 graphically illustrates for the points 0 to 9 of the trace 52 an angular position 54 of the load control butterfly valve 30 between a completely closed position 56 and an unthrottled position 58, a pressure 60 after the compressor 16 of the exhaust gas turbocharger 18 between a minimum value 62 and a maximum value 64, a position 66 of the on-off butterfly valve 26 between the position "off" or "completely closed" 68 and the position "on" or "completely open" 70, and a state 72 of the coupling 38 between "closed" or "a mechanical connection between crankshaft 36 and mechanically driven supercharger 20 is produced" 74 and "open" or "a mechanical connection between crankshaft 38 and mechanically driven supercharger 20 is broken" 76.

The trace 52 shows a curve of engine torque Md and engine speed $n_{mot}$, where, from point 0 to point 1 of the trace 52, the required engine torque rises, and from point 1 to point 4 of the trace 52, the required engine torque Md jumps suddenly to a value that is above the naturally aspirated engine full load 44 and the turbocharger full load 46. From point 4 to point 6 of the trace 52, the required engine torque remains above the turbocharger full load 46 and on the maximum load 50. At point 6, the required engine torque falls below the turbocharger full load 46, and at point 8 the required engine torque finally falls below the naturally aspirated engine full load 44. This curve of the trace from point 1 to point 9 represents a typical start-up operation with a motor vehicle that has the internal combustion engine of the invention as its power plant, with the required engine torque being determined by a driver.

As is immediately apparent from a comparison with FIG. 3, load control takes place from point 0 to point 2 of the trace 52 by means of the load control butterfly valve 30. During this stage, the on-off butterfly valve 26 is completely closed to prevent secondary air flow via the mechanically driven supercharger 20. From point 2 to point 3 of the trace 52, load control takes place by means of the turbine 22 of the exhaust gas turbocharger 18 (by a waste gate, variable turbine geometry, etc.).

When the required engine torque exceeds the turbocharger full load 46 at point 3 of the trace 52, the on-off butterfly valve 26 is opened completely, the mechanically driven supercharger 20 is activated by connecting the coupling 36 (graph 72 jumps from "open" 76 to "closed" 74), and the load control butterfly valve 30 is closed until point 4 is reached. In this range, the load control butterfly valve 30 operates as a recirculated air butterfly valve of the mechanically driven supercharger 20. The more completely the load control butterfly valve 30 is closed, the smaller is the mass flow flowing away from the intake pipe 32 via the load control butterfly valve 30, i.e., the charge pressure increases with the closing of the load control butterfly valve 30 when the mechanically driven supercharger 20 is connected.

From point 4 to point 5, the load control butterfly valve 30 is completely closed, the on-off butterfly valve 26 is opened, and the coupling 36 of the mechanically driven supercharger 20 is closed. As a result, the mass flow delivered by the compressor 16 of the turbocharger 18 is conveyed completely through the mechanically driven supercharger 20 and compressed to the maximum extent. Both superchargers operate with a maximum compression ratio.

At point 5, the maximum attainable engine torque (graph 50) is reached. From point 5 to point 6, the intake pipe pressure is adjusted to the level necessary for the maximum engine torque by opening the load control butterfly valve 30. At point 6, the load control butterfly valve 30 is completely opened, and the mechanically driven supercharger 20 is shut off by opening the coupling 36 and closing the on-off butterfly valve 26. Starting at point 6, the turbocharger 18 can produce the charge pressure necessary for the maximum engine torque solely via the waste gate, the variable turbine geometry, etc.

Starting at point 7, the charge pressure necessary for the required engine torque is reduced by the position of the waste gate, variable turbine geometry, etc., until the minimum charge pressure is reached at point 8 with the load control butterfly valve 30 completely open. To reduce the required torque further to point 9, the load control butterfly valve 30 is then closed as far as necessary.

When the torque demand by the driver is low, the on-off butterfly valve 26 is closed, the coupling 36 of the mechanically driven supercharger 20 is opened, and the exhaust gas turbocharger 18 is adjusted via the waste gate, variable turbine geometry, etc., in such a way that as little charge pressure as possible is produced. Load control occurs here as in a naturally aspirated engine: the farther the load control butterfly valve 30 is opened, the higher is the air mass flow supplied to the engine. If the torque demand rises above the maximum torque that can be produced in the naturally aspirated engine mode (point 2 of the trace 52), then the air mass flow is increased by adjusting the turbine 22 of the exhaust gas turbocharger 18 (waste gate, variable turbine geometry, etc.) and thus increasing the intake pipe pressure, so that the required engine torque can be reached. The load control butterfly valve 30 remains open during this process. If a still higher torque is demanded (point 3 of trace 52), then the coupling 36 of the mechanically driven supercharger 20 is closed, and the on-off butterfly valve 26 is completely opened. The charge pressure in the intake pipe 32 is increased by closing the load control butterfly valve 30.

Switching between dual charging and sole operation with the exhaust gas turbocharger 18 by cooperation between the load control butterfly valve 30 and the on-off butterfly valve 26 makes it possible, due to the dual function of the load control butterfly valve 30, on the one hand, as a conventional throttle valve at low engine torques below the intake pipe full load 44 and, on the other hand, as a recirculated air butterfly valve during operation above the turbocharger full load 46, to dispense with a throttle valve that would otherwise be necessary instead of the on-off butterfly valve 26.

The invention claimed is:

1. A method for operating an internal combustion engine having:
    a cylinder block,
    an air path for intake air,
    a mechanically driven supercharger installed in the intake air path,
    a connection between a crankshaft and the mechanically driven supercharger being selectively produced and broken by a coupling, which depends upon operating states of the internal combustion engine,
    an exhaust gas turbocharger,
    an intake pipe connected with air intakes of the cylinder block, and
    a charge cooler, the mechanically driven supercharger having a pressure outlet directly connected to the intake pipe, the exhaust gas turbocharger having a pressure outlet connected to a suction intake of the mechanically driven supercharger, wherein the pressure outlet of the exhaust gas turbocharger is connected to the suction intake of the mechanically driven supercharger via an on-off butterfly valve and to the intake pipe via a load control butterfly valve which is arranged upstream of the on-off butterfly valve, wherein the charge cooler is integrated in the intake pipe to form an intake charge cooler module, the method comprising the steps of:
    bringing the on-off butterfly valve into a completely closed position,
    deactivating the mechanically driven supercharger, and
    controlling the load by at least one of operating the load control butterfly valve and adjusting and turbocharger in the operating states of the internal combustion engine in which an instantaneous torque demand being produced by the exhaust gas turbocharger; and
    bringing the on-off butterfly valve into a completely open position,
    activating the mechanically driven supercharger, and
    closing the load control butterfly valve to an extent necessary to reach torque demand in the operating states of the internal combustion engine in which the instantaneous torque demand exceeds a maximum torque being produced by the exhaust gas turbocharger.

2. The method in accordance with claim 1, including closing the on-off butterfly valve during idling and in a lower partial-load range and maintaining the on-off butterfly valve completely open in all other operating states.

3. An internal combustion engine, comprising:
    a cylinder block;
    an air path for intake air;
    a mechanically driven supercharger installed in the intake air path;
    a connection between a crankshaft and the mechanically driven supercharger being selectively produced and broken by a coupling, which depends upon operating states of the internal combustion engine;
    an exhaust gas turbocharger;
    an intake pipe connected with air intakes of the cylinder block; and
    a charge cooler, the mechanically driven supercharger having a pressure outlet directly connected to the intake pipe, the exhaust gas turbocharger having a pressure outlet connected to a suction intake of the mechanically driven supercharger,
        wherein the pressure outlet of the exhaust gas turbocharger is connected to the suction intake of the mechanically driver supercharger via an on-off butterfly valve and to the intake pipe via a load control butterfly valve;
        wherein the load control butterfly valve is arranged upstream of the on-off butterfly valve, and
        wherein the charge cooler is integrated in the intake pipe to form an intake charge cooler module.

4. An internal combustion engine in accordance with claim 3, wherein the on-off butterfly valve is configured so that, in a completely closed state, the air path to the suction intake of the mechanically driven supercharger is essentially sealed against a secondary air flow through the mechanically driven supercharger.

5. The internal combustion engine in accordance with claim 3, wherein the mechanically driven supercharger is a compressor.

* * * * *